Figure 1:
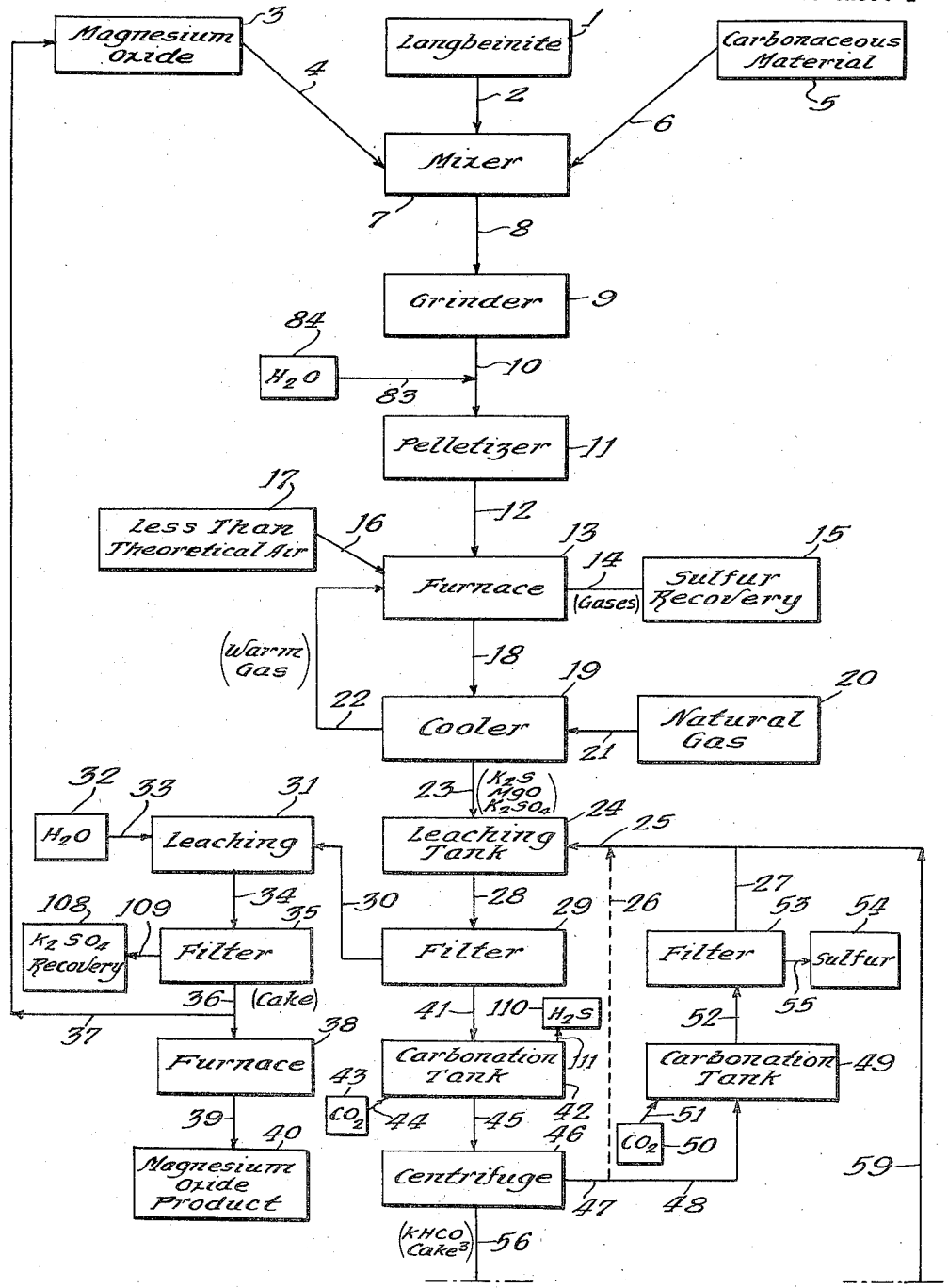

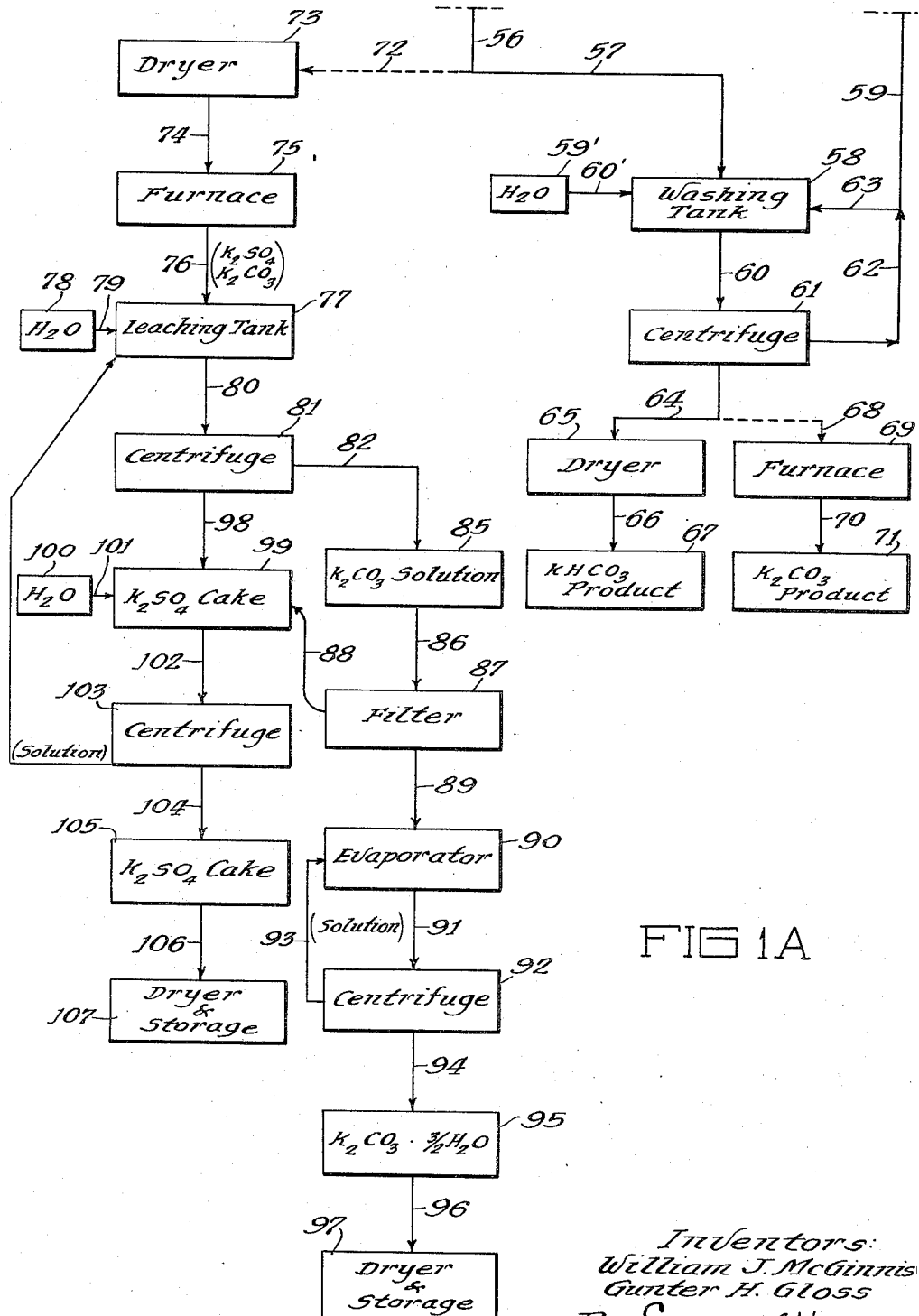

2,903,337

PRODUCTION OF POTASSIUM BICARBONATE

William J. McGinnis, Chicago, and Gunter H. Gloss, Lake Bluff, Ill., assignors to International Minerals & Chemical Corporation, a corporation of New York Application July 5, 1955, Serial No. 519,913

7 Claims. (Cl. 23—33)

This invention relates to the recovery of potassium values from langbeinite ore and, more particularly, to the recovery of potassium values from langbeinite ore in the form of potassium sulfate and potassium carbonate.

Langbeinite is a double salt of potassium sulfate and magnesium sulfate containing two molecules of the latter for each molecule of the former. Customarily, the potash values in langbeinite ore have been recovered by reacting langbeinite with an aqueous solution of potassium chloride to produce potassium sulfate. Potassium sulfate was crystallized from the solution and recovered, for example, by filtration. The potassium sulfate mother liquor may then be processed by one or another procedure to recover the magnesium chloride. This process for recovering potash values from langbeinite requires a high purity potassium chloride and has the further disadvantage that a fourth component, namely, chloride ions is added to the system. A process capable of recovering the potash values from langbeinite, without the use of any potassium chloride whatsoever would have obvious economic advantages, particularly, if the magnesium values could be recovered simultaneously in the form of magnesium oxide.

It is an object of this invention to recover the potash values from a double sulfate salt of potassium and magnesium without using potassium chloride.

It is another object of this invention to recover the potash values from langbeinite in the form of potassium sulfate and potassium carbonate.

It is a further object of this invention to recover the potash values from langbeinite ore as potassium sulfate and potassium carbonate which are virtually free of chloride contamination.

Another object of this invention is to provide a simple, commercially feasible process for recovering the potash values from langbeinite ore and to produce as a co-product magnesium oxide which is suitable for refractory or chemical applications.

Still another object of this invention is to recover the potash values from langbeinite in the form of potassium sulfate and potassium carbonate by a process utilizing a minimum amount of fresh water.

It is another object of this invention to prepare potassium bicarbonate of high purity from a reduced langbeinite without the necessity of a furnacing operation.

In accordance with one feature of this invention, potassium and magnesium values are recovered from a mixture containing essentially magnesium oxide, potassium sulfate and potassium sulfide by agitating the mixture with an aqueous solution of potassium bicarbonate preferably an aqueous solution saturated with respect to potassium sulfate and potassium bicarbonate, until substantially all the potassium sulfide is dissolved, separating the resulting solution from the residual solids, carbonating the solution and recovering potassium bicarbonate from the separated solution.

According to one embodiment of this invention, a double sulfate salt of potassium and magnesium, preferably langbeinite, but permissibly leonite or shoenite, is mixed with a carbonaceous material, such as petroleum coke and also with magnesium oxide or potassium carbonate, preferably magnesium oxide recovered in a subsequent step in the process. If the magnesium oxide or potassium carbonate contains sodium chloride or other materials which are not volatilized during the subsequent furnacing operation, these impurities will contaminate the potassium carbonate product. Magnesium oxide recycled from a subsequent step in the process will contain substantially no sodium chloride and is, therefore, a preferred source of magnesium oxide when it is desired that the products of the process be substantially chloride-free. The double salt utilized may contain up to about 2% sodium chloride, by weight, but desirably will contain substantially less than this amount in order to avoid the tendency of the reaction mixture to fuse during the furnacing operation. Preferably, the langbeinite will contain less than about 1% sodium chloride by weight. Fusing of the reaction mixture during the furnacing operation is undesirable as reducing the efficiency of the operation. Extensive fusion of the charge renders the process inoperable. If there is sodium chloride present in the magnesium oxide employed, the sodium chloride content of the langbeinite must be sufficiently low so that the langbeinite-magnesium oxide-carbonaceous material mixture does not contain more than 2% sodium chloride, by weight, if fusion is to be avoided. Preferably, the quantity of magnesium oxide or potassium carbonate present in the reaction admixture will amount to between about 5% and about 20%, based on the weight of langbeinite. Less than about 5% may be utilized, but the advantage of employing these materials is most significant at concentrations above about 5%. Fusion or softening of the reaction mass is not dependent solely on the sodium chloride concentration of the mixture, but may occur solely as a result of formation of sulfur compounds which form a eutectic melting in the range of temperatures employed in the furnacing operation. The presence of between about 5% and about 20% magnesium oxide and/or potassium carbonate in the reaction mixture eliminates the danger of fusion of the reaction mass due to formation of a eutectic and provides a commercially feasible process even when relatively impure starting materials having relatively high sodium chloride contents are employed.

The reduction reaction results in the production of a number of gaseous products, such as hydrogen sulfide, carbon monoxide, etc., which are collected and treated for the recovery of sulfur therefrom in accordance with standard practices of the art. The solid reaction product comprises essentially potassium sulfide, magnesium oxide and potassium sulfate and usually contains small amounts of potassium sulfite, potassium thiosulfate and other compounds of oxygen, potassium and sulfur. These solids are cooled in a dry non-oxidizing atmosphere to a temperature of less than about 100° C. and preferably to less than about 50° C. and then treated with an aqueous solution of potassium bicarbonate in an amount sufficient to dissolve all the potassium sulfide present but insufficient to dissolve a substantial proportion of potassium sulfate. Preferably, the aqueous solution will be saturated with both potassium bicarbonate and potassium sulfate. Magnesium oxide and potassium sulfate remain as the residue. Separation of the residue from the liquid phase can be effected in any convenient manner as, for example, by filtration or centrifuging. Potassium sulfate present in the residue can be separated from the magnesium oxide by leaching with water, leaving magnesium oxide. Magnesium oxide thus recovered is substantially entirely free from chloride contamination and is preferred material for mixing with langbeinite and carbonaceous material in the initial station. Alternatively, the magnesium oxide may be dried and purified by calcination. Magnesium oxide thus prepared is suitable for refractory or chemical applications. Potassium sulfate may be recovered from the leaching solution by crystallization in accordance with conventional procedures.

The leaching solution remaining following the removal of solid phase magnesium oxide and potassium sulfate, which solution contains essentially potassium sulfide, potassium bicarbonate, potassium sulfate, and also some intermediate sulfur compounds, for example, potassium thiosulfate and potassium sulfite, is carbonated by passing a carbon dioxide gas, such as boiler or kiln flue gas, through the solution until substantially all sulfide ions are removed from the solution, preferably, until the pH of the solution is adjusted to between about 7.9 and about 8.5. The carbonation reaction converts any potassium sulfide present to potassium bicarbonate. If the carbonation is allowed to proceed until the pH of the solution is adjusted to a value less than about pH 7.9, elemental sulfur will be precipitated and contaminate the precipitated potassium bicarbonate. On the other hand, it is desirable that the carbonation reaction be allowed to proceed until the pH approaches 7.9 in order that substantially all of the potassium sulfide present may be converted to potassium bicarbonate. The solid phase bicarbonate may be separated from the solution by any convenient means, for example, by filtration or centrifuging, after which it may be utilized as such or calcined to produce potassium carbonate.

Following removal of solid phase potassium bicarbonate, the solution remaining which is saturated with potassium sulfate and potassium bicarbonate may be recycled and used directly as a leaching solution for removing potassium sulfide from a fresh mixture of magnesium oxide, potassium sulfate, and potassium sulfide. The leaching procedure is preferably carried out at a temperature between about 25° C. and about 40° C. Carrying out the leaching step at a temperature above about 40° C. results in the production of a larger quantity of intermediate sulfur compounds than would otherwise be the case thereby reducing the yields of potassium bicarbonate obtained in the process. Usually the aqueous solution saturated with potassium sulfate and potassium bicarbonate which is utilized for leaching purposes is used in an amount at least as great as the weight of the mixture of magnesium oxide, potassium sulfate, and potassium sulfide which is to be leached and preferably in an amount about equal to the weight of the mixture. In any case the solution used is in sufficient amount to permit dissolution of all potassium sulfide in the mixture. By utilizing such a solution, the total quantity of fresh water utilized in the overall process is reduced to an absolute minimum and amounts to only about 15% of the amount which would be required if fresh water were used for leaching. In view of the fact that double sulfate solids of potassium and magnesium, such as, for example, langbeinite, leonite, and shoenite are presently available in commercial quantities, mostly in arid regions where water is not only expensive but is sometimes unobtainable, the process of this invention is particularly valuable in commercial operations in these locations, whereas a process requiring large amounts of fresh water would be completely unfeasible.

The process of this invention will be better understood from a consideration of the flow sheet shown in the drawing. Referring to the drawing, langbeinite 1 is charged into mixer 7 by line 2 and carbonaceous material 5 and magnesium oxide 3 are charged into mixer 7 by lines 6 and 4 respectively. The mixture is then fed into grinder 9 through line 8 where it is comminuted to a size of less than about 50 mesh and preferably less than about 80 mesh. The comminuted mixture is then moistened with water 84 which is added by line 83 and transferred to pelletizer 11 by line 10. Water is added in sufficient amount to permit the comminuted mixture to be formed into relatively hard rugged pellets but the amount of water is less than that which will result in a plugging of the dies in the pelletizing machine. Pellets are transferred to furnace 13 by line 12 where they are heated to a temperature between about 725° C. and about 1000° C. until the potassium sulfate component of the langbeinite is substantially completely reduced to potassium sulfide and magnesium sulfate is converted to magnesium oxide. Preferably, the furnace will be a direct-fired furnace operated with a reducing flame, although an indirect-fired furnace charged with a reducing atmosphere may be utilized if greater expense and low thermal efficiency can be tolerated. Exit gases from the furnace which comprise volatilized sulfur, hydrogen sulfide, water vapor, oxides of carbon, etc. are transferred to sulfur recovery 15 by line 14. Sulfur may be recovered from the gas by conventional means, for example, by the well known Claus process.

Solids from furnace 13 are conveyed to cooler 19 by line 18 where the solids are cooled in a relatively dry non-oxidizing atmosphere to a temperature below about 100° C. and preferably to about 50° C. before being conveyed to leaching tank 24 by line 23. Moisture present during the cooling increases greatly the tendency of the furnace product to re-oxidize. In accordance with a preferred embodiment of this invention, the cooling of the solids product is effected in a reducing atmosphere preferably by adding dry natural gas 20 to the cooler 19 by line 21. The natural gas thereby adsorbs heat from the solids product from the furnace and the heated natural gas is then conducted to furnace 13 by line 22 where it is utilized as a fuel. By using the preheated gas as fuel for firing the furnace substantially less than the quantity of air (about 60% of the theoretical required for complete combustion) ordinarily used in burning the natural gas in the furnace can be used and with the added advantage that the combustion gases produced are substantially richer in hydrogen and carbon monoxide and poorer in carbon dioxide and water vapor than when the gas is not pre-heated. Thus pre-heating the natural gas improves substantially the reducing characteristics of the reducing atmosphere in the furnace and thereby the efficiency of the furnace. Passing natural gas over the solids product from furnace 13 to effect the cooling thereof also serves another purpose. The solids product being in the reduced state is susceptible to oxidation and cooling it in the presence of air, oxygen, carbon dioxide or water results in oxidation of some of the potassium sulfide component present to potassium sulfate, thereby reducing the yield of potassium carbonate in the overall process. Cooling the solids product in the presence of natural gas, however, prevents any oxidation of the potassium sulfide and, therefore, maintains the yield of potassium carbonate at the maximum value attainable based on the reduction product obtained from furnace 13.

After cooling the solids product from furnace 13 in cooler 19, the cooled solids are transferred to leaching tank 24 by line 23 where they are mixed with an aqueous solution containing potassium bicarbonate, preferably an aqeuous solution containing potassium bicarbonate and potassium sulfate. An aqueous solution saturated with potassium sulfate and potassium bicarbonate is particularly preferred for this purpose as resulting in the best yields of potassium bicarbonate. The aqueous solution is added through line 25. Sufficient solution is added to the leaching tank to dissolve substantially all of the potassium sulfide present. Intermediate sulfur compounds, such as, potassium sulfite and potassium thiosulfate which are present in the solids will also be dissolved in the leaching solution. After dissolution of the potassium sulfide, the resulting slurry is transferred to filter 29 by line 28 where residual solids comprising essentially magnesium oxide and potassium sulfate are separated from the liquid phase. Following separation, the solids are transferred to leaching tank 31 by line 30 and agitated with water 32 entering the tank by line 33. The resulting slurry is transferred to filter 35 by line 34 and the aqueous phase is conveyed to potassium sulfate recovery 108 by line 109. The filter cake is transferred to furnace 38 by line 36 and calcined at a temperature of the order of 2500° F. Magnesium oxide product 40 is removed from the furnace by line 39. The filter cake from filter 35 may also be recycled by line 37 to the inital stage in the process and admixed with fresh langbeinite and carbonaceous material.

Filtrate from filter 29 is transferred by line 41 to carbonation tank 42. The filtrate comprises a solution of potassium sulfide, potassium sulfate, potassium bicarbonate and certain intermediate sulfur compounds, such as, potassium thiosulfate and potassium sulfite. Carbon dioxide containing gas 43 is added to the carbonation tank through line 44 until the pH of the solution is adjusted to between about 7.9 and about 8.5. During the carbonation reaction potassium sulfide is converted to potassium carbonate and potassium bicarbonate with hydrogen sulfide containing gases 110 being removed by line 111. Carbonation results in the formation and precipitation of solid phase bicarbonate and the resulting slurry is transferred to centrifuge 46 by line 45 where solid phase bicarbonate is separated.

Underflow from the centrifuge comprising solid potassium bicarbonate and small amounts of intermediate sulfur compounds is transferred to washing tank 58 by lines 56 and 57. Agitation of the contaminated potassium bicarbonate with water 59 entering the tank by line 60 results in the dissolution of the intermediate sulfur compounds, and the resulting slurry is transferred to centrifuge 61 by line 60 where solid potassium bicarbonate is separated from the liquid phase. Potassium bicarbonate issuing from centrifuge 61 is dried in drier 65 and potassium bicarbonate product 67 is removed from the dryer by line 66. Alternatively, the solid phase potassium bicarbonate from centrifuge 61 may be transferred to furnace 69 by line 68 and calcined. Potassium carbonate 71, thus produced, is removed from the furnace by line 70.

In accordance with one embodiment of this invention, the underflow from centrifuge 46, comprising solid potassium bicarbonate and small amounts of intermediate sulfur compounds, is transferred to drier 73 by lines 56 and 72. The dried solids are then conveyed to furnace 75 by conduit 74 where they are heated in an oxidizing atmosphere to convert any intermediate sulfur compounds to potassium sulfate.

Potassium bicarbonate present in the solids is also converted to potassium carbonate. Preferably, furnace 75 is a direct-fired furnace, such as a direct-fired rotary furnace, operated at a temperature of between about 400° C. and about 800° C., preferably between about 600° C. and about 700° C., with an oxidizing flame. The product from furnace 75 is conducted to leaching tank 77 by line 76 where it is agitated with water 78 added by line 79. The water is added in an amount sufficient to dissolve all of the potassium carbonate present, but insufficient to dissolve any substantial portion of the potassium sulfate component. Preferably, the leaching operation will be carried out at the lowest possible temperature in order to minimize dissolution of potassium sulfate. The slurry produced in leaching tank 77 is then conducted to centrifuge 81 by line 80 where the potassium carbonate solution is separated from the solid potassium sulfate. The potassium carbonate solution 85 which is removed from the centrifuge by line 82 is transferred to filter 87 by line 86 to remove any potassium sulfate solids present, and the potassium sulfate solids are conveyed by line 88 to be admixed with potassium sulfate solids 99 issuing from centrifuge 81 by line 98. The filtrate from filter 87 is transferred to evaporator 90 by line 89 where it is concentrated to a solids content of between about 40% and about 60%. The concentrated liquor is transferred to centrifuge 92 by line 91 and the overflow solution from centrifuge 92 is recycled to evaporator 90 by line 93. The solids issuing from centrifuge 92 by line 94 comprise essentially $K_2CO_3 \cdot 1.5H_2O$ and are sent to drier and storage 97 by line 96. This potassium carbonate is suitable for any commercial purpose. The potassium sulfate cake 99 issuing from centrifuge 81 by line 98 is washed with water 100 which is added to the cake by line 101. The resulting slurry is transferred to centrifuge 103 by line 102. The overflow solution from centrifuge 103 is recycled to leaching tank 77. Recycle of this solution minimizes the losses of potassium sulfate during the washing procedure. Potassium sulfate cake 105 is removed from centrifuge 103 by line 104 and sent to drier and storage 107 by line 106.

The liquid phase issuing from centrifuge 61 may be recycled to the washing tank 58 and used to leach contaminants from a fresh supply of potassium bicarbonate crystals. Periodically the overflow may be sent to waste when it becomes concentrated with waste products. Alternatively, the overflow from centrifuge 61 may be recycled to leaching tank 24 by lines 62, 59, and 25 and used for leaching a fresh reduction product mixture.

The overflow from centrifuge 46 is removed by line 47 and recycled by line 26 to leaching tank 24. This overflow comprises a saturated potassium bicarbonate solution and may be utilized directly for leaching the potassium values from the mixture issuing from cooler 19. Alternatively, and preferably, the overflow liquid from centrifuge 46 is transferred to carbonation tank entering the tank by line 51. The liquid is carbonated to a pH value of between about 5.5 and about 7, preferably to about pH 6 with the result that any elemental sulfur in the liquid is precipitated. The resultant slurry is transferred to filter 53 by line 52 and sulfur 54 is removed by line 55. The filtrate is then transferred by lines 27 and 25 to leaching tank 24 where it is used to treat as fresh reduction product mixture.

The following examples illustrate specific embodiments of this invention. All parts and percentages are by weight unless otherwise indicated.

*Example I*

Langbeinite containing about 0.5% sodium chloride was mixed in an amount of about 392 parts with about 39.2 parts magnesium oxide and about 58.8 parts of uncalcined petroleum coke. These reactants were ground to a size which passed through an 80 mesh screen and then, after the addition of about 49 parts of water to act as a binder, formed into pellets of about 0.3 inch in diameter at a pressure of about 10,000 p.s.i.

The pelletized or granulated feed was passed through a direct-fired reducing furnace in which natural gas was burned with only about 60% of the volume of the air required for complete combustion. In this gas atmosphere the product was heated at about 850° C. for about one hour, during which period the magnesium sulfate was converted to magnesium oxide and most of the potassium sulfate was reduced to potassium sulfide.

The exit gases from the furnace contained 60.4 parts sulfur values either as sulfur vapor or hydrogen sulfide plus other combustion products. These sulfur values were recovered by passing the gases through a conventional Claus furnace.

The solid reduced product from the furnace was cooled to about 50° C. in an atmosphere of dry natural gas to avoid reoxidation of the potassium sulfide formed during the reaction. The natural gas which was thus heated by contact with a hot reaction product solid was introduced into the furnace and burned as fuel.

The cooled reduction product contained about 88.6 parts potassium sulfide, 115.2 parts magnesium oxide, approximately 1 part unreacted carbon and 24.7 parts residual potassium sulfate (which includes a small amount of other potassium, sulfur, oxygen compounds such as potassium thiosulfate, potassium sulfite, etc.). This furnace product was agitated at room temperature with a recycled saturated potassium bicarbonate aqueous solution having the following approximate composition: 59.0 parts potassium bicarbonate, 7.7 parts potassium thiosulfate and other intermediate sulfur compounds, 6.8 parts potassium sulfate and 200 parts water. The resultant slurry was filtered in order to separate the solid phase magnesium oxide and potassium sulfate from the solution phase, and the filter cake was washed on the filter in order to displace most of the entrained potassium sulfide-potassium bicarbonate solution. Potassium sulfate was separated from the filter cake by leaching with water at about 80° C. to about 100° C. and recovered from the leaching solution by a conventional base exchange process. The solid residue after the second leaching contained almost all of the original magnesium values as magnesium oxide. A portion of the magnesium oxide was recycled to the start of the operation and admixed with fresh langbeinite and carbonaceous material. The remainder of the filter cake was calcined at elevated temperature to yield 72 parts magnesium oxide product suitable for refractory or chemical purposes.

The filtrate obtained from the first filtration operation comprised about 85 parts potassium sulfide, 56.0 parts potassium bicarbonate, 6.5 parts potassium sulfate, 7.1 parts potassium thiosulfate and other intermediate sulfur compounds, and 200 parts water. This solution was treated with boiler flue gas (10% to 12% carbon dioxide) at room temperature until the solution attained a pH of about 7.9. At this point substantially all of the sulfide had been converted to bicarbonate, the sulfide being volatilized as hydrogen sulfide gas. The product stream from the carbonation step was a slurry comprising about 170 parts water, 51.6 parts potassium bicarbonate, 6.5 parts potassium sulfate, 7.1 parts potassium thiosulfate and other intermediate sulfur compounds, all in solution, and 158.9 parts crystalline potassium bicarbonate. This slurry was centrifuged to separate the solid potassium bicarbonate from the solution phase. The solids from the centrifuge were slurried with a saturated potassium bicarbonate wash solution having a low concentration of sulfur compounds. This washing step serves to remove the entrained mother liquor from the crystals and to selectively solubilize any potassium sulfate and potassium thiosulfate and other intermediate sulfur compounds which may have crystallized with the potassium bicarbonate. After centrifuging to separate the crystals from the solution phase, the crystals were dried at 110° C. to yield 145 parts potassium bicarbonate product having a purity of about 99%.

The solution phase obtained by centrifuging the carbonation slurry was recycled to the primary leaching circuit. A sufficient amount of solution from the potassium bicarbonate washing step was added to the recycle primary leach solution to maintain the desired volume in the primary leaching circuit. Fresh water is added to the wash solution to maintain the desired quantity of solution in this step. Addition of fresh water also serves to maintain the concentration of sulfur compounds at a low level.

*Example II*

A cool reduction product consisting of about 88.6 parts potassium sulfide, about 115.2 parts magnesium oxide, about 1 part unreacted carbon and about 24.7 parts residual potassium sulfate including a small amount of other potassium sulfur and oxygen compounds so called intermediate sulfur compounds, such as, potassium sulfite, potassium thiosulfate, etc. was prepared in the manner of Example I. This cool furnace product was agitated at room temperature with a recycled saturated potassium bicarbonate solution having the following approximate composition: 59.0 parts potassium bicarbonate, 7.7 parts potassium thiosulfate and other intermediate sulfur compounds, 6.8 parts potassium sulfate, and 200 parts water. The resulting slurry was filtered in order to separate the solid phase magnesium oxide and potassium sulfate from the solution phase, and the filter cake was washed on the filter in order to displace most of the entrained potassium sulfide-potassium bicarbonate solution. Potassium sulfate was separated from the filter cake by leaching with water at 80–100° C. and recovered from the leaching solution by a conventional base exchange process. The solid residue after the second leaching contained almost all of the original magnesium values as magnesium oxide. A portion of the magnesium oxide was recycled to the start of the operation and admixed with fresh langbeinite and carbonaceous material. The remainder of the filter cake was calcined at elevated temperature to yield 72 parts magnesium oxide product suitable for refractory or chemical purposes.

The filtrate obtained from the first filtration operation comprised about 85 parts potassium sulfide, 56.0 parts potassium bicarbonate, 6.5 parts potassium sulfate, 7.1 parts potassium thiosulfate and other intermediate sulfur compounds, and 200 parts water. This solution was treated with boiler flue gas (10% to 12% carbon dioxide) at room temperature until the solution has attained a pH of about 7.9. At this point substantially all of the sulfide had been converted to bicarbonate, the sulfide being volatilized as hydrogen sulfide gas. The product stream from the carbonation step was a slurry which consists of 170 parts water, 51.6 parts potassium bicarbonate, 6.5 parts potassium sulfate, 7.1 parts potassium thiosulfate and other intermediate sulfur compounds, all in solution, and 158.9 parts crystalline potassium bicarbonate. This slurry was centrifuged to separate the solid potassium bicarbonate from the solution phase. The overflow solution from the centrifuge was again treated with boiler flue gas at normal temperature until the solution attained a pH of about 6.0. During this carbonation about 4 to 5 parts free sulfur are precipitated. The slurry was filtered to remove the precipitated sulfur and the cake was washed with water to remove the entrained solution. The filtrate and wash solution were combined and recycled to the primary leaching circuit. The wet sulfur cake was dried to give 4–5 parts pure sulfur. The sulfur removal step is optional. Also sulfur can be precipitated with the potassium bicarbonate and vaporized during calcination if desired.

The wet potassium bicarbonate crystals obtained by centrifuging the first carbonation slurry consisted of about 158.9 parts potassium bicarbonate, 10 parts water plus small amounts of potassium sulfate, potassium thiosulfate and other intermediate sulfur compounds. These wet crystals were dried and then calcined at 600–700° C. under oxidizing conditions in order to convert all the sulfur compounds present to sulfate.

The calcined product was a simple mixture of potassium carbonate and potassium sulfate which was resolved by selectively leaching the carbonate while substantially all of the sulfate remained in the solid form. The slurry was centrifuged and the centrifuge cake washed and dried to yield the potassium sulfate product. The solution which contains the potassium carbonate was again evaporated and dried to yield 100 parts of an anhydrous potassium carbonate product having a purity greater than about 99%.

Having thus fully described and illustrated the character of the instant invention, what is desired to be secured by Letters Patent is:

1. A cyclic process for selectively dissolving potassium sulfide from a mixture thereof with magnesium oxide and potassium sulfate and for preparing solid-phase potassium bicarbonate from the resulting solution, which comprises leaching said mixture with an aqueous solution saturated with potassium bicarbonate in an amount sufficient to dissolve substantially all of the potassium sulfide present therein but insufficient to dissolve any substantial proportion of the potassium sulfate, separating the resulting solution from the residual solids, treating said solution with carbon dioxide to a pH between about 7.9 and about 8.5, whereby potassium bicarbonate is precipitated therefrom, separating the solid-phase potassium bicarbonate, and recycling the residual solution for leaching an additional quantity of said mixture.

2. A process as in claim 1 wherein said aqueous solution saturated with potassium bicarbonate is saturated also with potassium sulfate.

3. A process as in claim 1 wherein said leaching is carried out at a temperature between about 25 and about 40° C.

4. A process as in claim 1 in which the solid-phase potassium bicarbonate is dried and heated in an oxidizing atmosphere until all of the sulfur compounds therein are converted into potassium sulfate, the oxidized mixture is agitated with water in a quantity sufficient to dissolve the potassium carbonate present therein but insufficient to dissolve a substantial proportion of the potassium sulfate, the undissolved solids are separated from the liquid phase, and potassium carbonate is recovered from said liquid phase by concentrating the liquid phase, crystallizing potassium carbonate therein and separating solid phase potassium carbonate from the liquid phase.

5. The process of claim 1 in which said mixture is obtained by commingling carbonaceous material with a double sulfate salt of potassium and magnesium containing less than about 2% sodium chloride by weight, comminuting the resulting mixture and forming said mixture into pellets, and heating the mixture at a temperature between about 725 and about 1000° C. until said double salt is substantially reduced to magnesium oxide, potassium sulfide, and potassium sulfate.

6. The process of claim 5 in which said double sulfate salt of potassium and magnesium is langbeinite.

7. A cyclic process for selectively dissolving potassium sulfide from a mixture thereof with magnesium oxide and potassium sulfate and for preparing solid-phase potassium bicarbonate from the resulting solution, which comprises leaching said mixture with an aqueous solution saturated with potassium bicarbonate in an amount sufficient to dissolve substantially all of the potassium sulfide present therein but insufficient to dissolve any substantial proportion of the potassium sulfate, separating the resulting solution from the residual solids, treating said solution with carbon dioxide to a pH between about 7.9 and about 8.5, whereby potassium bicarbonate is precipitated therefrom, separating the solid-phase potassium bicarbonate, treating the residual solution with carbon dioxide to a pH between about 5.5 and about 7, whereby sulfur is precipitated therefrom, separating the sulfur, and recycling the residual solution for leaching an additional quantity of said mixture.

References Cited in the file of this patent

UNITED STATES PATENTS

| | | |
|---|---|---|
| 1,975,798 | Partridge | Oct. 9, 1934 |
| 1,983,789 | Bradley et al. | Dec. 11, 1934 |

FOREIGN PATENTS

| | | |
|---|---|---|
| 1,361 | Great Britain | June 3, 1859 |
| 819 of 1869 | Great Britain | Mar. 17, 1869 |

OTHER REFERENCES

Mellor's Modern Inorganic Chemistry, Longmans, Green and Co., New York, 1939, pp. 150–152.

Eastman et al.: "Physical Chemistry," McGraw-Hill Book Co., Inc., 1947, pp. 359–361.

Mellor: "Comprehensive Treatise on Inorganic and Theoretical Chemistry," vol. 2, page 774, 1922, Longmans, Green and Co., New York, vol 10, p. 181, 1930.